C. Z. ITO.
EXPRESSION DOLL.
APPLICATION FILED FEB. 9, 1915.
1,160,080.
Patented Nov. 9, 1915.
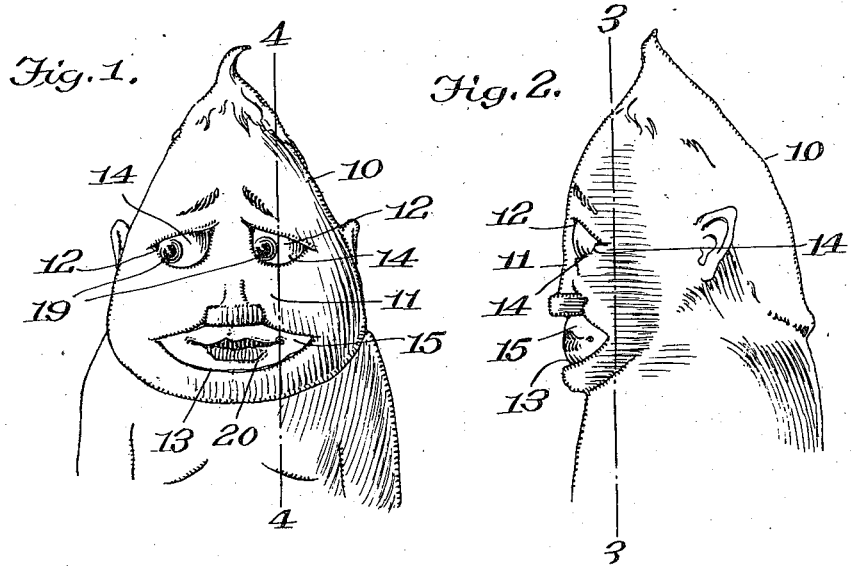
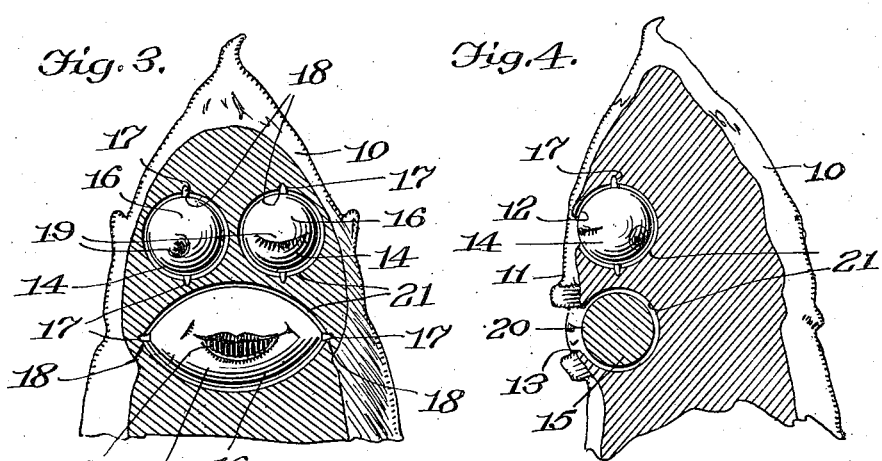
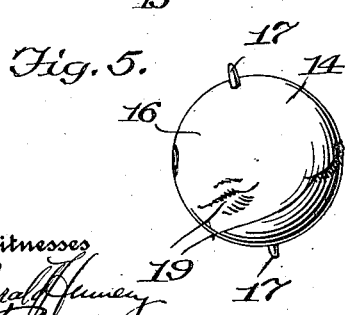
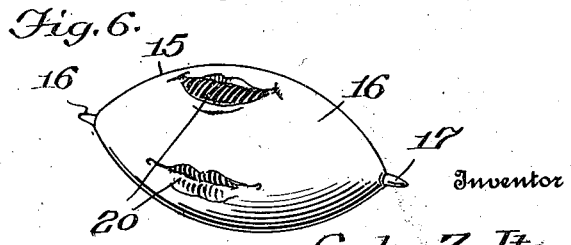
Inventor
Corley Z. Ito,
By Victor J. Evans
Attorney
Witnesses

UNITED STATES PATENT OFFICE.

CORLEY Z. ITO, OF LOS ANGELES, CALIFORNIA.

EXPRESSION-DOLL.

1,160,080.

Specification of Letters Patent.  Patented Nov. 9, 1915.

Application filed February 9, 1915.  Serial No. 7,081.

*To all whom it may concern:*

Be it known that I, CORLEY Z. ITO, a subject of the Emperor of Japan, residing at Los Angeles, in the county of Los Angeles and State of California, have invented new and useful Improvements in Expression-Dolls, of which the following is a specification.

The invention relates to games and toys, and more particularly to dolls, and has for an object to provide a doll in which portions of the face can be so arranged to change the expressions thereof as desired.

The invention contemplates, among other features, the provision of a doll contemplating the usual doll head and which may simulate any desired form or configuration of face, movable members simulating eye balls or the mouth being arranged upon the head to change the expressions of the face as desired.

In the further disclosure of the invention reference is to be had to the accompanying drawings, constituting a part of this specification, in which similar characters of reference denote corresponding parts in all the views, and in which:

Figure 1 is a front elevation of the expression doll; Fig. 2 is a side elevation; Fig. 3 is a vertical sectional view taken on the line 3—3 in Fig. 2; Fig. 4 is a vertical sectional view taken on the line 4—4 in Fig. 1; Fig. 5 is a perspective view of one of the eye balls; and Fig. 6 is a perspective view of the mouth ball.

Referring more particularly to the views, I disclose a head 10 suitably ornamented and designed to provide a face 11, said head being provided with eye sockets 12 simulating the orbits of the eyes, with an opening 13 simulating the mouth. Eye balls 14 are provided for the eye socket 12 and a mouth ball 15 is provided for the opening 13, said eye and mouth balls 14 and 15 each consisting of a preferably spherical or almost spherical body 16 having projecting pins or bearings 17 which operate loosely in suitable recesses 18 formed in the head 10. Each of the eye balls 14 is provided with a series of marks or indications 19 simulating the eyes and the mouth ball 15 is provided with a series of marks or indications 20 simulating various expressions of the mouth.

Referring particularly to the views, it will be seen that the eye balls 14 are arranged to rotate horizontally, that is, they turn about a vertical axis, the bearings 17 being vertically disposed, whereas the mouth ball 15 rotates vertically or around a horizontal axis, said mouth ball having its bearings horizontally disposed. With a construction of the character shown it will be clearly seen that the eye balls 14 can be readily rotated by the finger from the exterior of the head and so also with the mouth ball, so that the various marks 19 and 20 on the eye balls and mouth ball 14 and 15, respectively, can be brought into view through the openings formed by the eye sockets 12 and opening 13, thus resulting in ludicrous and amusing expressions, which can be readily changed by simply slightly rotating the eye balls or mouth ball so that the desired mark or indication on said balls will appear to view from the exterior of the head.

From the foregoing description it will be apparent that the device described consists of few and simple parts that cannot readily get out of order; that it can be cheaply manufactured and it will be clearly apparent that the eye balls and mouth ball are preferably mounted directly in the head as clearly shown, the head being preferably solid and having grooved out or recessed portions 21 in which the eye balls and mouth ball are arranged when the doll or head is constructed.

Having thus described my invention, I claim:

As a new article of manufacture, an expression doll comprising a head provided with a series of recesses, a plurality of said recesses forming sockets and one of said openings forming a mouth in the face of the head, eye balls for the sockets adapted to lie in the recesses thereof, and a member adapted to lie in one of the recesses and project into the opening forming the mouth, said eye balls and member each formed of a body having a curved face and bearings projecting from the body, with the eye balls simulating eyes and the member having representations of mouths thereon, said bearings being journaled in the head to permit of rotation of the body within its particular recess and whereby portions of the curved face of the body will appear through the openings in the head, the bearings of said eye balls being vertically disposed whereby said eye balls will rotate in horizontal planes and the bearings of said member being horizontally disposed whereby said member will rotate in a vertical plane.

In testimony whereof I affix my signature in presence of two witnesses.

CORLEY Z. ITO.

Witnesses:
 LILLIAN EDMONDS,
 R. WINNEET.